United States Patent [19]

Abukawa et al.

[11] Patent Number: 5,642,176
[45] Date of Patent: Jun. 24, 1997

[54] COLOR FILTER SUBSTRATE AND LIQUID CRYSTAL DISPLAY DEVICE

[75] Inventors: Kotaro Abukawa, Atsugi; Toshimitsu Tanaka, Hadano, both of Japan

[73] Assignee: Canon Kabushiki Kaisha, Tokyo, Japan

[21] Appl. No.: 562,379

[22] Filed: Nov. 24, 1995

[30] Foreign Application Priority Data

Nov. 28, 1994 [JP] Japan .................................. 6-293509

[51] Int. Cl.⁶ .................................................. G02F 1/1335
[52] U.S. Cl. ............................ 349/106; 349/108; 349/109
[58] Field of Search ............................ 359/54, 66, 68, 359/888, 891; 345/88, 89, 149; 348/760, 761; 430/7

[56] References Cited

U.S. PATENT DOCUMENTS

| | | | |
|---|---|---|---|
| 4,800,375 | 1/1989 | Silverstein | 340/703 |
| 4,892,391 | 1/1990 | Stewart et al. | 359/68 |
| 4,946,259 | 8/1990 | Matino et al. | 359/68 |
| 5,157,524 | 10/1992 | Dijon et al. | 359/54 |

FOREIGN PATENT DOCUMENTS

| | | |
|---|---|---|
| 0317063 | 5/1989 | European Pat. Off. |
| 4-355722 | 12/1992 | Japan ............................ 359/68 |
| 4371923 | 12/1992 | Japan. |

*Primary Examiner*—William L. Sikes
*Assistant Examiner*—Tai V. Duong
*Attorney, Agent, or Firm*—Fitzpatrick, Cella, Harper & Scinto

[57] ABSTRACT

Disclosed herein is a liquid crystal display device comprising a liquid crystal held between a pair of bases each equipped with at least a transparent electrode, and pixels each having at least four color regions which are divided from one another, wherein the four color regions in one pixel comprise a first region in which a filter for red is arranged to display a red color, a second region in which a filter for blue is arranged to display a blue color, a third region in which a filter for green is arranged to display a green color, and a fourth region in which a filter for red, a filter for blue and a filter for green are arranged to display a color.

16 Claims, 5 Drawing Sheets

COLOR FILTER SUBSTRATE AND LIQUID CRYSTAL DISPLAY DEVICE

BACKGROUND OF THE INVENTION

1. Field of the Invention

The present invention generally relates to a color filter substrate suitable for use in display devices in which a multi- or full-color display is conducted by combinations of lighting of individual colors, and a liquid crystal color display device using such a filter substrate, and particularly to a liquid crystal color display device in which a multi- or full-color display is conducted by combinations of lighting of four colors of red, blue, green and white.

2. Related Background Art

Various liquid crystal color display devices, which conduct a color display, have heretofore been proposed. As a general device thereof, there is a display device in which one pixel is formed by 3 dots which display 3 colors of red (R), blue (B) and green (G), respectively, and the color display is conducted within the limit of eight colors by combinations of on-off of these dots.

However, in recent years, there has been a strong demand for improvement in the quality of the color display, and so it has been desired that a liquid crystal color display device which can display still more colors be developed. FIG. 1 illustrates an example of such a display device. This liquid crystal color display device 1 is equipped with four color units 2R, 2B, 2G and 2W. These color units 2R, 2B, 2G and 2W are so constructed that filters for red, blue, green and white colors are arranged on a base of the device to display the respective colors. They are also so constructed that in addition to the above-described 8 colors, intermediate colors thereof can also be displayed by combinations of lighting or not lighting, i.e., on or off, of these color units 2R, 2B, 2G and 2W.

These filters for the respective colors are formed by patterning on a base making up the device in accordance with a photolithgraphic process. Since only a filter for one color can be formed by one photolithgraphic step, the photolithographic step has been repeated 4 times for the production of a color filter substrate. Photosensitive resins in which respective colorants were dispersed have been used for the formation of the filters for red, blue and green colors (hereinafter referred to as red filter, blue filter and green filter, respectively), while a photosensitive resin in which no colorant was dispersed has been used for the formation of a filter for a white color (hereinafter referred to as a white filer).

Since the white filter is formed by the photosensitive resin in which no colorant has been dispersed, as described above, its in-plane film-thickness distribution characteristics greatly differ from the other color filters. As a result, the film thickness in every dot of the white filter obtained after the patterning becomes uneven, and so a difference in film thickness between the white filter and the other color filters reaches about 1,500 to 2,000 Å, and a great difference in level arises within one pixel in the surface on the liquid crystal side of a color filter substrate, resulting in failure to flatten. For this reason, the alignment behavior of a liquid crystal becomes uneven within one pixel in a liquid crystal color display device, and the drive margin is lowered. In a liquid crystal display device in which a distance (gap) between opposite substrates is small, such as, for example, a display device using a ferroelectric liquid crystal, that problem has been marked.

In addition, the above prior art technique requires to carry out patterning 4 times according to the respective colors of the filters. Therefore, there has been a problem that the production process is complicated compared with the formation of the color filter substrate composed of 3 colors, and so material cost and production cost also increase.

SUMMARY OF THE INVENTION

The present invention has been made in view of the foregoing circumstances and has as its object the provision of a color filter substrate which can enhance the quality of a color display and lessen a difference in level between filters for different colors and hence has homogeneous properties, and a liquid crystal display device using this color filter substrate.

Another object of the present invention is to provide a color filter substrate, by which the number of times of patterning can be decreased to reduce the production cost, and a liquid crystal color display device using the color filter substrate.

The above objects can be achieved by the present invention described below.

According to the present invention, there is thus provided a color filter substrate, comprising, on a base, first color regions each comprising a filter for red, second color regions each comprising a filter for blue, third color regions each comprising a filter for green, and fourth color regions each comprising a filter for red having an area smaller than the filter in the first color region, a filter for blue having an area smaller than the filter in the second color region and a filter for green having an area smaller than the filter in the third color region.

According to the present invention, there is also provided a liquid crystal display device comprising a liquid crystal held between a pair of bases each equipped with at least a transparent electrode, and pixels each having at least four color regions which are divided from one another, wherein the four color regions in one pixel comprise a first region in which a filter for red is arranged to display a red color, a second region in which a filter for blue is arranged to display a blue color, a third region in which a filter for green is arranged to display a green color, and a fourth region in which a filter for red, a filter for blue and a filter for green are arranged to display a color.

BRIEF DESCRIPTION OF THE DRAWINGS

FIGS. 6A through 6E typically illustrate a production process of a liquid crystal color display device according to an embodiment of the present invention, in particular, a production process of a color filter substrate, in which FIG. 6A illustrates a state that a layer of a photosensitive resin has been formed on a glass base, FIG. 6B illustrates an exposure step, FIG. 6C illustrates a state that the exposure step has been completed, FIG. 6D illustrates a state that a development step has been completed, and FIG. 6E illustrates a state that the color filter substrate has been completed.

DESCRIPTION OF THE PREFERRED EMBODIMENTS

The preferred embodiments of the present invention will hereinafter be described in detail by reference to the drawings.

Figure 1:
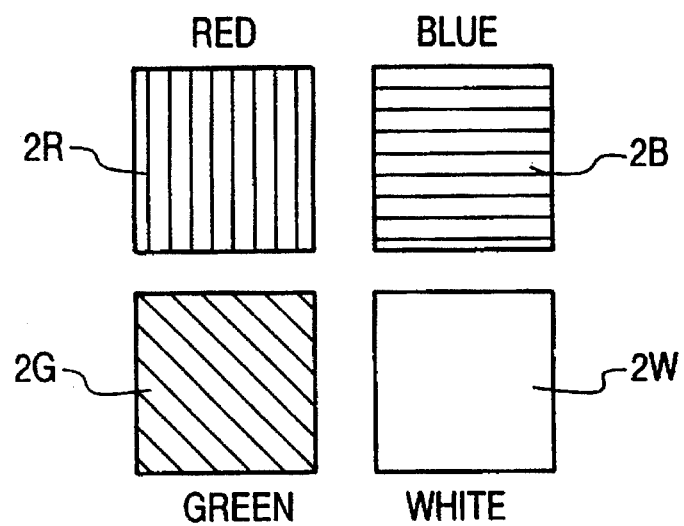
FIG. 1 typically illustrates the constitution of one pixel in a conventional liquid crystal color display device.
Figure 2:
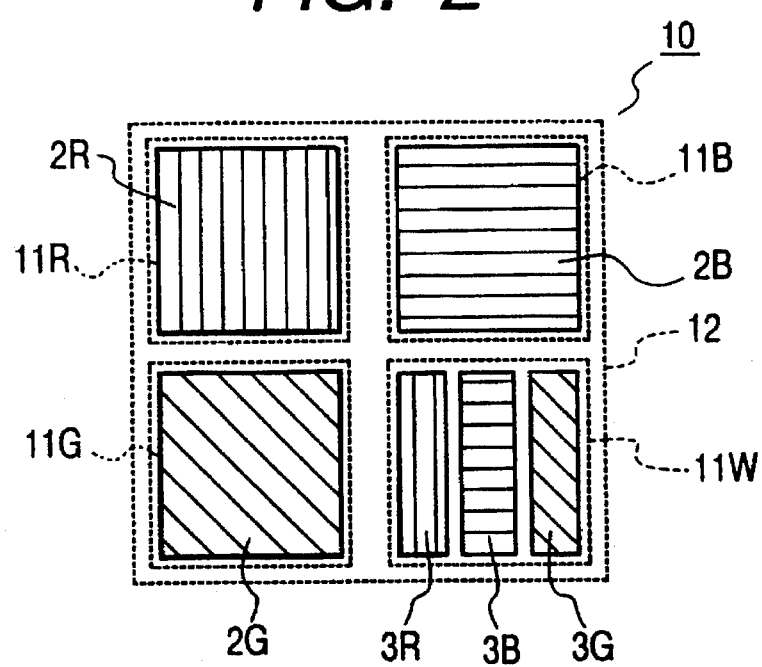
FIG. 2 is a plan view illustrating the constitution of one pixel in a liquid crystal display device according to an embodiment of the present invention.

FIG. 2 illustrates an example of a planar structure of a pixel in a liquid crystal display device 10, in which a color filter substrate according to the present invention has been mounted, viewed from the side of an observer (the color filter substrate).

As illustrated in FIG. 2, the liquid crystal color display device 10 according to this embodiment is equipped with four color regions (dots) 11R, 11B, 11G and 11W, which display red, blue, green and white colors, respectively. A pixel 12 is constructed by a set of these four color regions 11R, 11B, 11G and 11W. These color regions are so constructed that a first region (dot) 11R is provided with a red filter 2R corresponding thereto so as to display a red color, a second region (dot) 11B is provided with a blue filter 2B corresponding thereto so as to display a blue color, and a third region (dot) 11G is provided with a green filter 2G corresponding thereto so as to display a green color. These color filters 2R, 2B and 2G are preferably formed on a base in such a manner that their areas are substantially equal to one another. For example, each of the filters 2R, 2B and 2G is formed into a 200 by 200 μm square. On the other hand, a fourth region (dot) 11W is provided with color filters 3R, 3B and 3G for red, blue and green corresponding thereto and is preferably so constructed that a white color is displayed by lighting these three colors at the same time. The color filters 3R, 3B and 3G are preferably preset in such a manner that their areas are each smaller than the color filter, 2R, 2B or 2G and are equal to one another. More specifically, the filters 3R, 3B and 3G are preset in such a manner that they are all in the form of a rectangle, for example, 200 μm long by 50 μm broad, and an area ratio among them are 1:1:1.

Figure 3A:
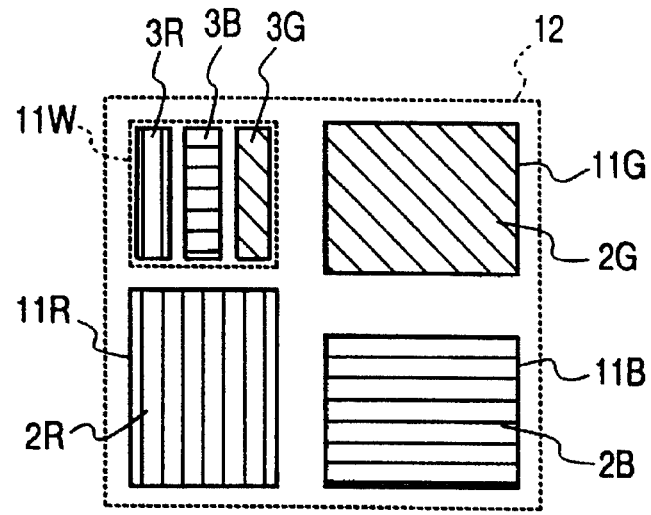
FIGS. 3A through 3C are plan views illustrating the constitution of one pixel in the liquid crystal display device according to various embodiments of the present invention.
Figure 3B:
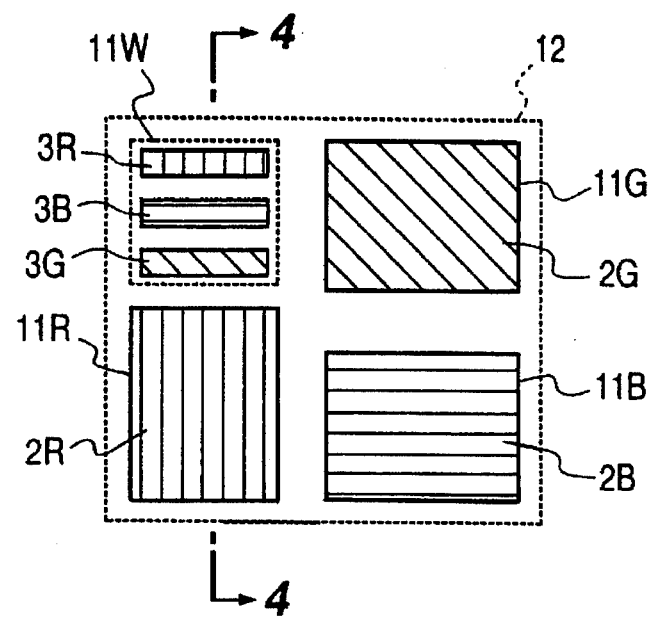
Figure 3C:
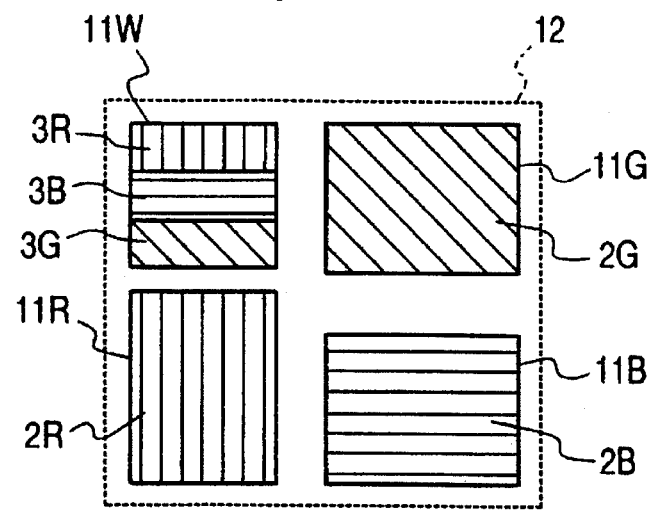

FIGS. 3A through 3C illustrate other preferable embodiments of the planar constitution (viewed from the side of an observer) of one pixel in a liquid crystal display device 10 in which the color filter substrate according to the present invention has been mounted.

In the embodiments illustrated in FIGS. 3A and 3B, as a color filter corresponding to the fourth region 11W which displays a white color, color filters 3R, 3B and 3G of red, blue and green are formed separately from one another and in the form of a stripe like the embodiment illustrated in FIG. 2. In the embodiment illustrated in FIG. 3C, minute color filters 3R, 3B and 3G of red, blue and green are formed adjoiningly to one another and in the form of a stripe so as to correspond to the fourth region 11W which displays a white color.

In such a liquid crystal display device as described above, more specifically, a mask composed of a light-screening material such as a metal is provided on portions of a color filter substrate other than those corresponding to the color filters 2R, 2B, 2G, and 3R, 3B and 3G on the liquid crystal side of the substrate through a flattening layer, a transparent electrode and the like, for example, in a manner described below, whereby regions through which light of the respective colors actually permeates through these color filters, i.e., portions which can become actually effective color regions 11R, 11B, 11G and 11W, are defined. In the present invention, the color regions 11R, 11B and 11G may be different in shape from one another, but their areas are preferably equal to one another. With respect to the color region (dot) 11W, the area is preferably preset smaller compared with the other regions 11R, 11B and 11G taking the visibility by the human eyes upon multi-color display into consideration. The color region 11W may be formed either of 3 color filters 3R, 3B and 3G and filter-free transparent portions defined therebetween as illustrated in FIG. 2, FIG. 3A and FIG. 3B, or of 3 color filters 3R, 3B and 3G only as illustrated in FIG. 3C.

The liquid crystal display device according to the present invention as described above features that in addition to the color region (dot) 11R displaying a red color, the color region (dot) 11B displaying a blue color and the color region (dot) 11G displaying a green color, the color display being based on the constitution of their corresponding color filters and the like, the fourth color region 11W comprising minute red, blue and green filters, 3R, 3B and 3G is provided. In this manner, a difference in film thickness between the color region of white and other color regions is depressed compared with the case where the region displaying a white color is formed by providing the white (transparent) filter because the red, blue and green filers are better in controllability of film thickness compared with the white filter, so that the evenness within the pixel is enhanced. In this case, in view of the fact that there is a possibility that the transmittance of the whole pixel may be somewhat lowered due to the use of the colored filters in the fourth color region, the sizes of the color filters 3R, 3B and 3G corresponding to the fourth color region 11W are changed according to brightness required as illustrated in FIG. 2 and FIGS. 3A to 3C, whereby the transmittance upon the display of the white color in the fourth color region can be controlled. In the case where high brightness is required, transmitted light is increased by widening spaces between the color filters 3R, 3B and 3G as illustrated, for example, in FIG. 3A. In order to produce a white color, however, it is desirable that the area ratio among the color filters 3R, 3B and 3G be 1:1:1. When the spaces are widened, a problem of flattening between the color filters and the spaces in the fourth region arises. However, a difference in thickness between the individual colors, i.e., between the first, second and third regions, and the fourth regions is more important as the evenness in the color filter substrate than a difference in level between the color filters and the spaces. Therefore, the formation of the fourth color region displaying a white color in a state that 3R, 3B and 3G have been separated from one another may be better in some cases than the formation of the white region by the white filter different in thickness distribution characteristics from the other color filters.

The color filters 2R, 2B, 2G, and 3R, 3B and 3G are formed on the surface of a glass base G so as to form many pixels (in FIG. 2 and FIGS. 3A to 3C, only one pixel is illustrated). The glass base G on which the color filters 2R, 2B, 2G, and 3R, 3B and 3G have been formed in this manner is bonded to another glass base in an opposing relation after forming a transparent electrode and an alignment-controlling film thereon. A liquid crystal is charged into a space between these bases, thereby fabricating a liquid crystal color display device.

Figure 4:
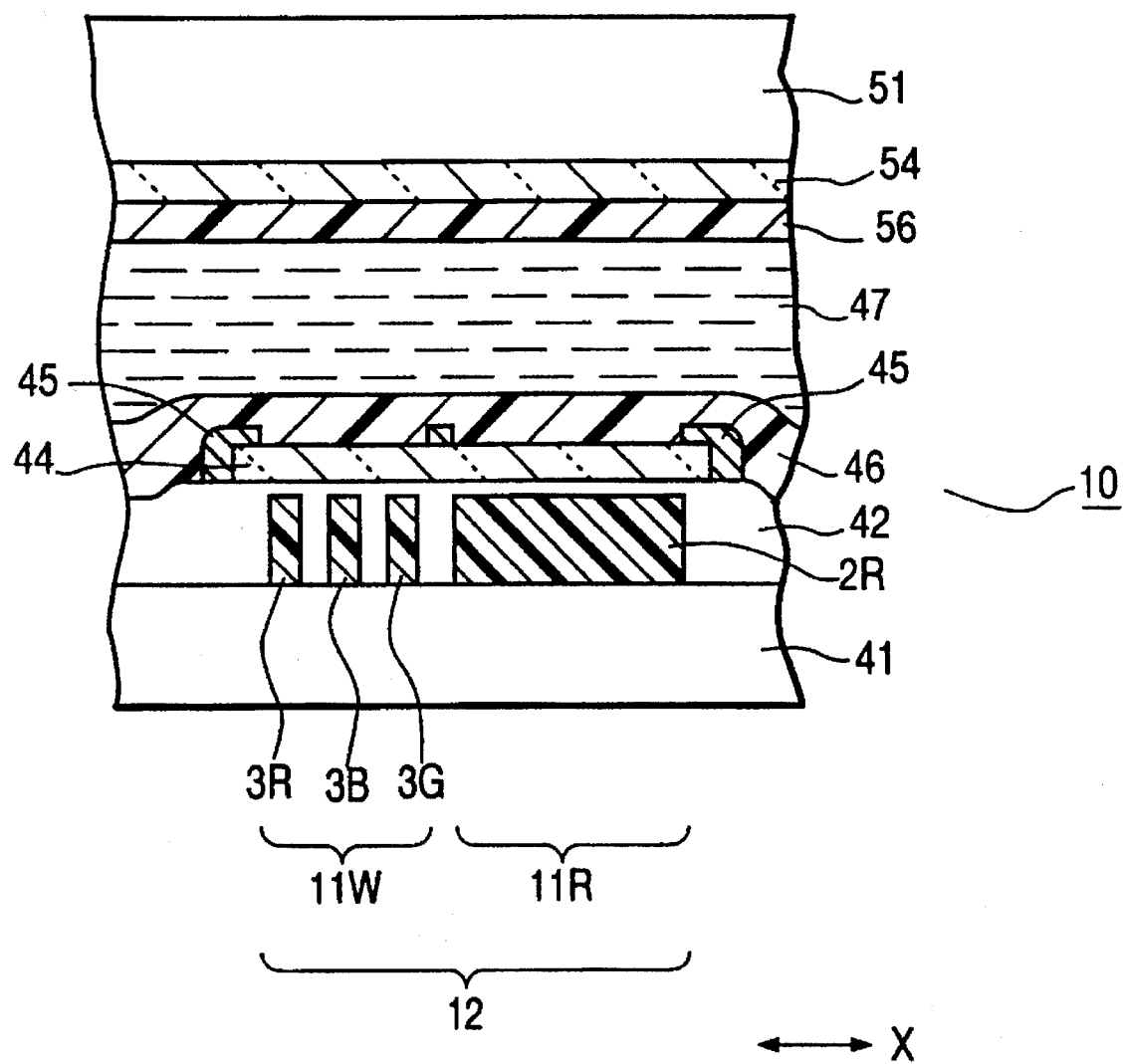
FIG. 4 is a cross-sectional view illustrating the structure of the liquid crystal display device taken along line 4—4 in FIG. 3B.

FIG. 4 illustrates the sectional structure (sectional structure taken along line 4—4 in FIG. 3B) of an exemplary liquid crystal display device having the pixel constitution shown in FIG. 3B.

In the structure illustrated in FIG. 4, first of all, a color filter 2R making up the color region 11R and color filters 3R, 3B and 3G making up the color region 11W, the areas of which are preferably equal to one another, are formed on one transparent base such as glass. The pattern of these color filters may be formed by any of various methods. For example, they may be formed by patterning photosensitive organic polymer films each containing a colorant of the desired color, for example, polyamide or polyimide films, in accordance with a photolithgraphic process as described below. A flattening layer 42 is formed on these filters so as to iron out irregularities between the individual filters. Such a flattening layer 42 may be formed by any material so far as it irons out a difference in level between the color filters, protects the color filters during the subsequent steps and has good heat resistance and chemical resistance. Examples of the material used include polyamide, epoxy resins and organic silane resins.

In order to prevent the color mixing, a light-shielding layer (not illustrated) may preferably be formed between pixels 12 comprising color regions made up by these color filters.

A barrier layer (not illustrated) is formed on the flattening layer 42 as needed, and a transparent electrode 44 composed of a transparent conductive material such as ITO is formed in such a predetermined pattern as corresponding to the underlying color filter layer. An auxiliary electrode 45 is further formed in a predetermined pattern on the transparent electrode 44 so as to lower the resistance of the transparent electrode 44. In the embodiment illustrated in FIG. 4, regions through which light permeates may be defined by the pattern of such an auxiliary electrode 45. As a material for the auxiliary electrode 45, there may be used, for example, a metallic material such as Cr, Nb, Al or an alloy thereof.

On the transparent electrode 44 and the auxiliary electrode 45, an alignment-controlling layer 46 for controlling the alignment state of a liquid crystal to be used is formed through an optional layer for preventing short circuit to an opposing base side or improving other device functions. Examples of the alignment-controlling layer 46 to be used include films of organic polymer films such as polyimide and polyamide, and inorganic films, which have been optionally subjected to a uniaxial alignment treatment such as rubbing.

On the other hand, another alignment-controlling layer 56 is formed on the other transparent base 51 such as glass through a transparent electrode 54.

These bases 41 and 51 are arranged in an opposing relation through a spacer in a given shape and an adhesive material (both, not illustrated), and a liquid crystal 47 is charged into a space therebetween.

As the liquid crystal material 47, there may be used chiral smectic liquid crystals exhibiting ferroelectric characteristics, and besides liquid crystal materials for twisted nematic (TN) and super-twisted nematic (STN) modes.

In the liquid crystal display device according to the embodiment described above, a difference in film thickness is depressed between particularly, the color filters 3R, 3B and 3G making up the white-displaying region 11W, and the color filter 2R making up the red-displaying region 11R. Accordingly, the evenness in the white-displaying region 11W within the device, for example, the evenness of the portion of the alignment-controlling layer 46 corresponding to the region 11W becomes good, and so a distance (gap) between both bases within one pixel and within the device is kept even. Therefore, the constitution of the present invention is favorable for a liquid crystal display device of which a narrower cell gap is required, specifically, a liquid crystal display of which a cell gap not wider than 3 μm is required. This is particularly useful, for example, in a liquid crystal display device using a chiral smectic liquid crystal such as a liquid crystal exhibiting ferroelectric characteristics.

In the liquid crystal display device according to the present invention, for example, a simple matrix structure is applied, in which the states of display (lighting) and non-display (unlighting) of the respective color regions in one pixel can be controlled to conduct a color display. In this regard, detailed description will be given by reference to FIGS. 5A and 5B.

Figure 5A:
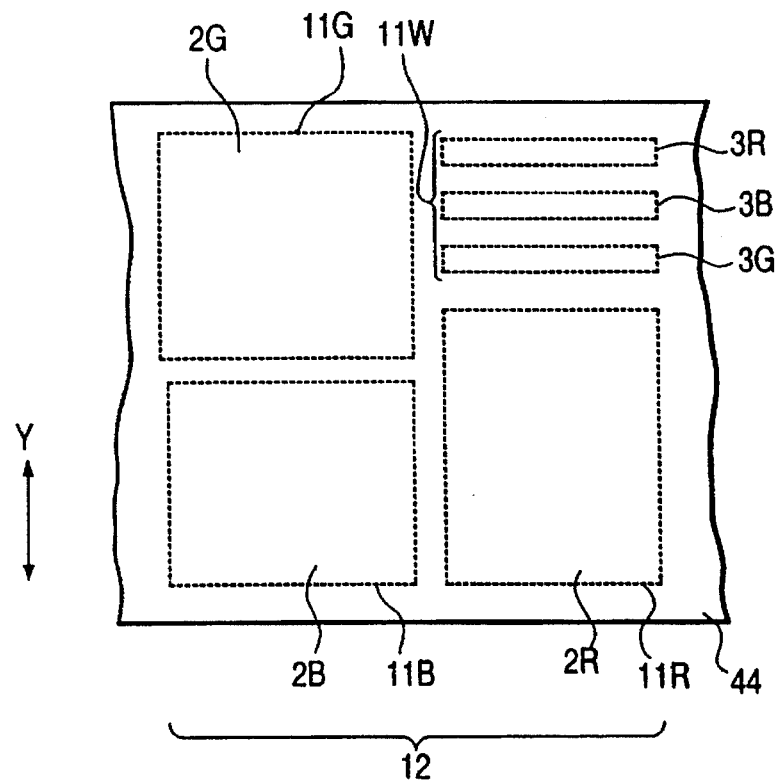
FIGS. 5A and 5B are plan views illustrating the arrangement of transparent electrodes and color filters in the pixel of the liquid crystal display device shown in FIG. 4.
Figure 5B:
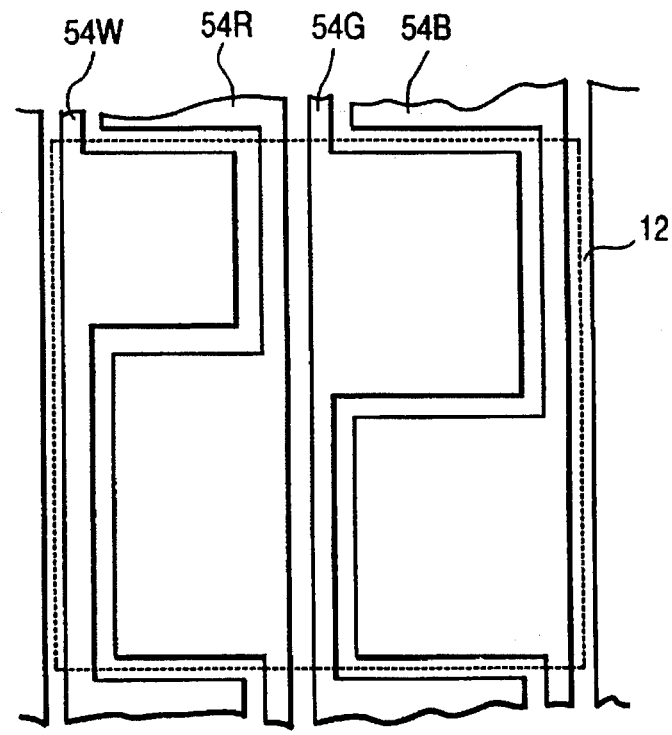

FIG. 5A illustrates an exemplary arrangement of the transparent electrode, color regions and color filters on the side of the base 41 in one pixel 12 of the liquid crystal display device of the structure shown in FIGS. 3B and 4, while FIG. 5B illustrates an exemplary arrangement of the transparent electrode, color regions and color filters on the side of the base 51 in one pixel 12 of the liquid crystal display device. The arrangements of the parts in the drawings are both viewed from the liquid crystal side. The ordinate axis direction (Y) in FIG. 5A corresponds to the horizontal direction (X) in FIG. 4. The layers existing on the liquid crystal side beyond the transparent electrodes are omitted.

As illustrated in FIG. 5A, on the side of the base 41, the transparent electrode (common electrode) 44 is formed as a scanning electrode on the color filters 2R, 2B, 2G, and 3R, 3B and 3G in the one pixel 12. On the other hand, as illustrated in FIG. 5B, on the side of the base 51, transparent electrodes (segment electrodes) 54R, 54B, 54G and 54W are formed as information electrodes correspondingly to the color filters 2R, 2B, 2G and 3R, 3B and 3G on the side of the base 41 in the pixel 12. Thus, the color regions 11R, 11B, 11G and 11W are defined by regions in which the predetermined portions of the underlying transparent electrode corresponding to the color filters on the side of the base 41 intersect with the transparent electrodes on the side of the base 51. If the transparent electrode 44 and the electrode 54R on the side of the base 51 are selected, the color region 11R equipped with the color filter 2R, which is an intersection thereof, becomes a state of a display (lighting). If the transparent electrode 44 and the electrode 54W on the side of the base 51 are selected, the color region 11W equipped with the color filters 3R, 3B and 3G, which is an intersection thereof, becomes a state displaying a white color by the simultaneous display (lighting) of the three colors. A multicolor display in one pixel is conducted by the combination of the display and the non-display of the individual color regions in the pixel.

An illustrative production process of the color filters 2R, 2B, 2G, and 3R, 3B and 3G according to the embodiment described above will hereinafter be described by reference to FIGS. 6A through 6E.

Figure 6A:
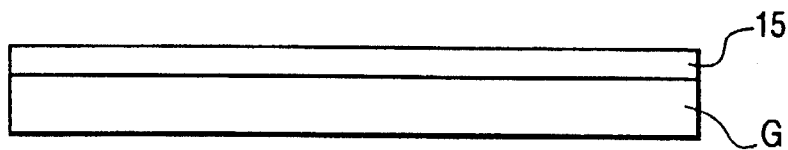
Figure 6B:
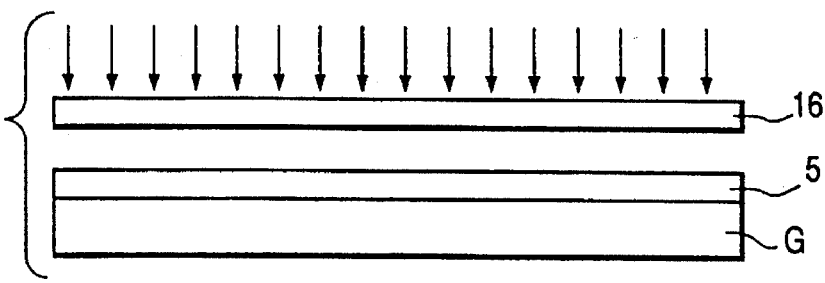
Figure 6C:
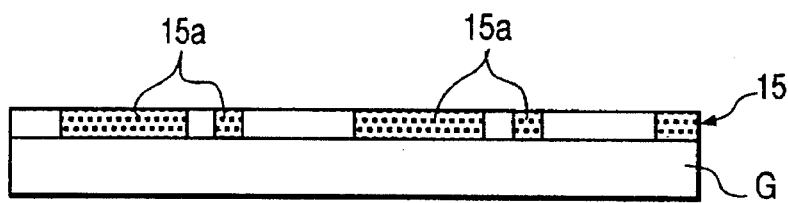
Figure 6D:
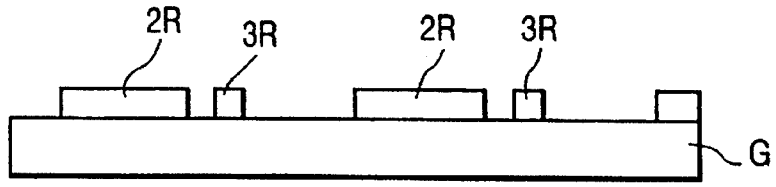
Figure 6E:
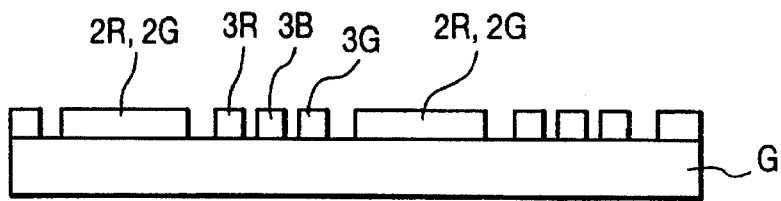

A solution of a photosensitive resin (PA 1012, trade name, product of Ube Industries, Ltd.) is first coated on the whole surface of a glass base G having a thickness of 1 mm by a spin coater to form a photosensitive resin layer 15 (see FIG. 6A). This solution is Composed mainly of a polyamide resin, and, for example, a red pigment has been dispersed therein. The glass base G on which the photosensitive resin layer 15 has been formed is then prebaked at a temperature of 85° C. only for 10 minutes. Thereafter, the photosensitive resin layer 15 is subjected to exposure by means of a photomask 16 (see FIG. 6B) to photo-set only the desired portions 15a of the photosensitive resin layer 15 (see FIG. 6C). A developer is then sprayed on the photosensitive resin layer 15 to remove unset portions (portions other than the portions 15a) thereof, thereby forming larger color filters 2R and smaller color filters 3R at the same time (see FIG. 6D). This operation is repeated for the blue filters 2B and 3B, and the green filters 2G and 3G, thereby forming a color filter substrate on the glass base G so as to correspond to the final color regions.

The operation and effects of the liquid crystal display device described above will be then described.

According to the liquid crystal display device of the above-described constitution, a color display can be conducted within the limit of 8 colors by the combinations of the three color regions 11R, 11B and 11G, which display red, blue and green colors, respectively, in one pixel. In addition, the intermediate colors thereof can be displayed by lighting the color region 11W displaying a white color, thereby enhancing the quality of the color display.

According to this embodiment, a display of the white color is achieved by the simultaneous lighting of the red filter 3R, the blue filter 3B and the green filter 3G. There is no need for using any white filter greatly different in in-plane film-thickness distribution characteristics from the other color filters. More specifically, the three color filters 3R, 3B and 3G substantially equal in the characteristics to the color filters 2R, 2B and 2G are used, and so a difference in level between the individual filters can be lessened, thereby flattening the resulting color filter substrate. As a result, the drive margin of the liquid crystal display device 10 can be enhanced to a great extent. A liquid crystal color display device 10 was fabricated to measure a difference in level between each of the color filters in the color regions 11R, 11B and 11G and the color filters 3R, 3B and 3G in the color region 11W. It was found to be as small as at most 500 Å for a substrate 300 by 350 mm in size.

In addition, it is only necessary to form the filters 2R, 2B, 2G, and 3R, 3B and 3G for 3 colors, and so the number of times of patterning can be decreased compared with the case where 4 color filters including a white filter are formed. As a result, the production process is simplified, yield is improved, and the material cost and production cost are also reduced.

Further, the area ratio among the red filter 3R, blue filter 3B and green filter 3G in the color region 11W is controlled to 1:1:1, whereby a proper white color is displayed by the lighting of this color region 11W.

According to the present invention, as described above, a color display is conducted by combinations of 4 colors of red, blue, green and white, and so the number of colors to be displayed is increased compared with the case of 3 colors of red, blue and green, and the quality of the color display can hence be enhanced.

According to the present invention, the display of a white color is achieved by the simultaneous lighting of the red, blue and green filters. Therefore, there is no need for using any white filter greatly different in in-plane film-thickness distribution characteristics from the other color filters. Namely, the three color filters substantially equal in the characteristics are used, and so a difference in level between the individual filters can be lessened, thereby flattening the resulting color filter substrate. As a result, the drive margin of a liquid crystal display device, in particular, a display device using a ferroelectric liquid crystal can be enhanced to a great extent.

In addition, it is only necessary to form the filters for 3 colors, and so the number of times of patterning is decreased compared with the case where 4 color filters are formed. As a result, the production process is simplified, yield is improved, and the material cost and production cost are also reduced.

Besides, when the area ratio among the red filter, blue filter and green filter in the fourth color region is controlled to 1:1:1, a white color is displayed by the lighting of this color region.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A color filter substrate, comprising, on a base, first color regions each comprising a filter for red, second color regions each comprising a filter for blue, third color regions each comprising a filter for green, and fourth color regions each comprising a filter for red having an area smaller than the filter in the first color region, a filter for blue having an area smaller than the filter in the second color region and a filter for green having an area smaller than the filter in the third color region.

2. The color filter substrate according to claim 1, wherein a ratio among the area of the filter for red in the first color region, the area of the filter for blue in the second color region and the area of the filter for green in the third color region is 1:1:1.

3. The color filter substrate according to claim 1, wherein a ratio among the area of the filter for red, the area of the filter for blue and the area of the filter for green in the fourth color region is 1:1:1.

4. A liquid crystal display device comprising a liquid crystal held between a pair of bases each equipped with at least a transparent electrode, and pixels each having at least four color regions which are divided from one another, wherein the four color regions in one pixel comprise a first region in which a filter for red is arranged to display a red color, a second region in which a filter for blue is arranged to display a blue color, a third region in which a filter for green is arranged to display a green color, and a fourth region in which a filter for red, a filter for blue and a filter for green are arranged to display a color.

5. The liquid crystal display device according to claim 4, wherein regions corresponding to the red filter, blue filter and green filter in the fourth region are lighted or not lighted at the same time to display a white color.

6. The liquid crystal display device according to claim 4, wherein a ratio among the area of the first color region, the area of the second color region and the area of the third color region is 1:1:1.

7. The liquid crystal display device according to claim 6, wherein at least two of the first, second and third color regions are different in shape from each other.

8. The liquid crystal display device according to claim 4, wherein a ratio among the area of the filter for red corresponding to the first color region, the area of the filter for blue corresponding to the second color region and the area of the filter for green corresponding to the third color region is 1:1:1.

9. The liquid crystal display device according to claim 4, wherein the area of the fourth color region is smaller than any of the first, second and third color regions.

10. The liquid crystal display device according to claim 5, wherein a ratio among the area of the filter for red, the area of the filter for blue and the area of the filter for green in the fourth color region is 1:1:1.

11. The liquid crystal display device according to claim 4, wherein the filter for red, the filter for blue and the filter for green in the fourth color region are arranged separately from one another.

12. The liquid crystal display device according to claim 4, wherein the filter for red, the filter for blue and the filter for green in the fourth color region are arranged adjoiningly to one another, and a display is conducted only through these three color filters.

13. The liquid crystal display device according to claim 4, wherein transparent electrodes on a pair of the bases construct a simple matrix structure.

14. The liquid crystal display device according to claim 4, wherein a distance between a pair of the bases is 3 μm or less.

15. The liquid crystal display device according to claim 4, wherein the liquid crystal is a liquid crystal exhibiting a chiral smectic phase.

16. The liquid crystal display device according to claim 4, wherein the liquid crystal is a liquid crystal exhibiting ferroelectric characteristics.

* * * * *